(12) United States Patent
Keidar et al.

(10) Patent No.: US 12,515,817 B2
(45) Date of Patent: *Jan. 6, 2026

(54) MICRO-PROPULSION SYSTEM

(71) Applicant: The George Washington University, Washington, DC (US)

(72) Inventors: Michael Keidar, Baltimore, MD (US); Jonathan Kolbeck, San Jose, CA (US); Denis Zolotukhin, Tomsk (RU)

(73) Assignee: The George Washington University, Washington, DC (US)

( * ) Notice: Subject to any disclaimer, the term of this patent is extended or adjusted under 35 U.S.C. 154(b) by 111 days.

This patent is subject to a terminal disclaimer.

(21) Appl. No.: 18/238,249

(22) Filed: Aug. 25, 2023

(65) Prior Publication Data

US 2023/0406544 A1  Dec. 21, 2023

Related U.S. Application Data

(63) Continuation of application No. 16/645,334, filed as application No. PCT/US2018/055199 on Oct. 10, 2018, now Pat. No. 11,760,508.

(60) Provisional application No. 62/570,303, filed on Oct. 10, 2017.

(51) Int. Cl.
*B64G 1/40* (2006.01)
*B64G 1/10* (2006.01)
*F03H 1/00* (2006.01)

(52) U.S. Cl.
CPC .............. *B64G 1/10* (2013.01); *B64G 1/413* (2023.08); *F03H 1/0081* (2013.01)

(58) Field of Classification Search
CPC .......... B64G 1/405; B64G 1/413; B64G 1/10; F03H 1/0081
See application file for complete search history.

(56) References Cited

U.S. PATENT DOCUMENTS

| 2,992,345 | A | * | 7/1961 | Siegfried | H05H 1/54 |
| | | | | | 310/11 |
| 3,447,322 | A | * | 6/1969 | Mastrup | F03H 1/00 |
| | | | | | 219/121.57 |
| 4,821,509 | A | * | 4/1989 | Burton | F03H 1/0087 |
| | | | | | 60/204 |
| 6,250,070 | B1 | * | 6/2001 | Kreiner | F03H 1/0043 |
| | | | | | 60/202 |

(Continued)

FOREIGN PATENT DOCUMENTS

| CN | 106593799 A | 4/2017 |
| EP | 3139041 A1 | 3/2017 |

(Continued)

OTHER PUBLICATIONS

International Search Report and Written Opinion for PCT/US2018/055199, dated Dec. 7, 2018, 9 pages.

(Continued)

*Primary Examiner* — Tye William Abell
(74) *Attorney, Agent, or Firm* — BLANK ROME LLP

(57) ABSTRACT

A thruster has a first stage and a second stage. The first stage is a plasma source that outputs a plasma. The second stage is an accelerator. In one embodiment, the second stage is a plasma accelerator that accelerates the plasma. In another embodiment, the second stage is an ion accelerator that accelerates the ions from the plasma.

16 Claims, 8 Drawing Sheets

(56) References Cited

U.S. PATENT DOCUMENTS

| | | | | |
|---|---|---|---|---|
| 6,378,290 B1* | 4/2002 | Killinger | ............... | H05H 1/54 |
| | | | | 60/202 |
| 7,400,096 B1* | 7/2008 | Foster | .................. | H01J 27/18 |
| | | | | 315/111.41 |
| 9,194,379 B1* | 11/2015 | Biblarz | .................. | F03H 1/00 |
| 2013/0067883 A1* | 3/2013 | Emsellem | ............ | F03H 1/0081 |
| | | | | 60/202 |
| 2016/0273524 A1* | 9/2016 | Keidar | ............... | F03H 1/0081 |
| 2017/0198683 A1* | 7/2017 | Yamazaki | ............ | H01J 27/16 |
| 2018/0106243 A1* | 4/2018 | Knoll | .................. | H02K 44/10 |
| 2018/0370659 A1* | 12/2018 | Keidar | ............... | B64G 1/405 |

FOREIGN PATENT DOCUMENTS

| | | |
|---|---|---|
| WO | WO-2014/127325 A1 | 8/2014 |
| WO | WO-2017/146797 A1 | 8/2017 |

OTHER PUBLICATIONS

Supplementary European Search Report for EP 18866529, dated May 10, 2021, 4 pages.

* cited by examiner

MICRO-PROPULSION SYSTEM

RELATED APPLICATIONS

This application is a continuation application of U.S. patent application Ser. No. 16/645,334, filed Mar. 6, 2020, which is a national phase application of PCT/US2018/055199, filed Oct. 10, 2018, which claims the benefit of U.S. Provisional Application No. 62/570,303, filed Oct. 10, 2017. The entire contents of these applications are incorporated herein by reference.

BACKGROUND OF THE INVENTION

Field of the Invention

The present invention relates to micro-propulsion devices. More particularly, the present invention relates to micro-propulsion devices for satellite devices such as CubeSats, nano satellites and microsatellites (e.g., less than 100 kg class satellites), though can also be utilized for larger satellites.

Background of the Related Art

Generally, electric propulsion systems are operated in what is called "single-stage" operation, which means that a thruster can have specific capabilities regarding thrust, specific impulse, and efficiency. Some propulsion systems can be throttled and they do indeed change the different parameters mentioned above, but these are not part of the scope of this research. Usually, the propulsion system can be operated at an optimum point, although occasions for variation exist. For specific applications such as orbit raising maneuvers where high thrust is required, a specific thruster will be needed. For maneuvers such as station-keeping, one would prefer a thruster with high specific impulse ($I_{sp}$). Therefore, two separate single-stage thrusters will be required if both maneuvers are to be performed efficiently.

Propulsion devices are being studied as part of NASA's Electric Propulsion Program [6]. Some examples of two-stage propulsion systems are the P5-2 (5 kW) thruster which was designed and tested at the University of Michigan [7], the Helicon Hall Effect Thruster (600 W-1200 W) [8], the Linear Gridless Ion Thruster (2 kW) [9], the VASIMR engine (200 kW) [10, 11], the D-80 Thruster with Anode Layer (TAL, 3 kW) [12], and the Very High Specific Impulse Thruster with Anode Layer (VHITAL, 25-36 kW) [13], amongst many others. As an example, the VHITAL thruster yields a TPR of 26 mN/kW and an $I_{sp}$ of 6000 s in single-stage mode, whereas in the two-stage mode, the TPR drops to 19.7 mN/kW but the $I_{sp}$ increases to 8000 s. Single-stage operation in Hall-effect thrusters (HET) and TAL systems is limited to voltages of around 1 kV and after this point, they experience a significant drop in efficiency due to severe anode heating [13]. This can be overcome by separating the ionization and the acceleration regions, i.e. with a two-stage system [13]. These systems, however, have their drawbacks.

Two-stage systems tend to be more inefficient than their counterparts at lower voltages. The P5 thruster was developed by Air Force Research Labs (AFRL) and is a 5 kW HET thruster. The P5-2 is the two-stage development by the University of Michigan, also for 5 kW operation. At voltages below 450 V, the P5-2 (single-stage, SS) is equivalent to the P5, since they are practically the same thruster. With these parameters, the P5-2 (two-stage, TS) is slightly more inefficient than the P5 and P5-2 SS. At voltages above this threshold, the P5-2 SS loses performance compared to the P5 due to small changes that were made in the discharge channel but the P5 2 TS has a better performance than both single-stage thrusters. No data is available for values above 500 V due to damage to the thruster.

One of the most concerning issues is the higher erosion of the main thruster components such as the electrodes and dielectric components. In two-stage operation, the thruster is subject to higher powers, which are derived from the higher voltages that are applied. Consequently, the kinetic energy of the particles is significantly higher and cause a larger amount of surface sputtering on both metallic and non-metallic surfaces. Prolonged occurrence may lead to failure in the ceramic components, and the plasma could reach other electrical components, resulting in short circuits. Additionally, the higher electric power causes the thruster's temperature to increase, leading to damage or deformation of specific components. Furthermore, incorporating another stage to the system increases the complexity of the system, as more complicated circuitry is required for optimum operation. Another main issue that can be seen by the power at which the thrusters operate (number in parentheses after each thruster) is that none of these thrusters cater to small satellites.

All thrusters mentioned above operate at powers of at least 0.5 kW, a power level that is unfeasible for most small satellites. The literature review currently shows no available two-stage devices for CubeSat applications in the market. To summarize, the foremost technical challenges to date for two-stage systems are the higher component erosion, higher thermal loads, system complexity, and the current unavailability for smaller-sized spacecraft.

SUMMARY OF THE INVENTION

The issue with single stage propulsion systems can be addressed by a two-stage propulsion system. The invention provides a two-stage propulsion system having two modes of operation. In a two-stage mode, the ionization stage is separate from the acceleration stage. In single stage operation (i.e. $2^{nd}$ stage turned off), the thruster provides a high thrust-to-power ratio (TPR) and is ideal for orbital change maneuvers, whereas the two-stage operation provides a higher specific impulse and is ideal for station-keeping and interplanetary missions, where efficient use of the propellant is more important than thrust. The use of two-stage thrusters benefits a broad amount of missions, such as all-electric satellites for geostationary applications (high-thrust LEO (Low Earth Orbit) to GEO (Geostationary Orbit) transfer, high $I_{sp}$ station-keeping and drift corrections once in orbit). Interplanetary probes and sample return missions to asteroids also benefit from this development.

These and other objects of the invention, as well as many of the intended advantages thereof, will become more readily apparent when reference is made to the following description, taken in conjunction with the accompanying drawings.

BRIEF DESCRIPTION OF THE FIGURES

FIG. 3(*b*) is a detailed view of the screen grid and acceleration grid;

FIG. 8(*b*) is a graph of ion-to-arc current ration as function of $U_a$, without and with maximal current in magnetic coil;

DETAILED DESCRIPTION OF THE PREFERRED EMBODIMENTS

Figure 1:
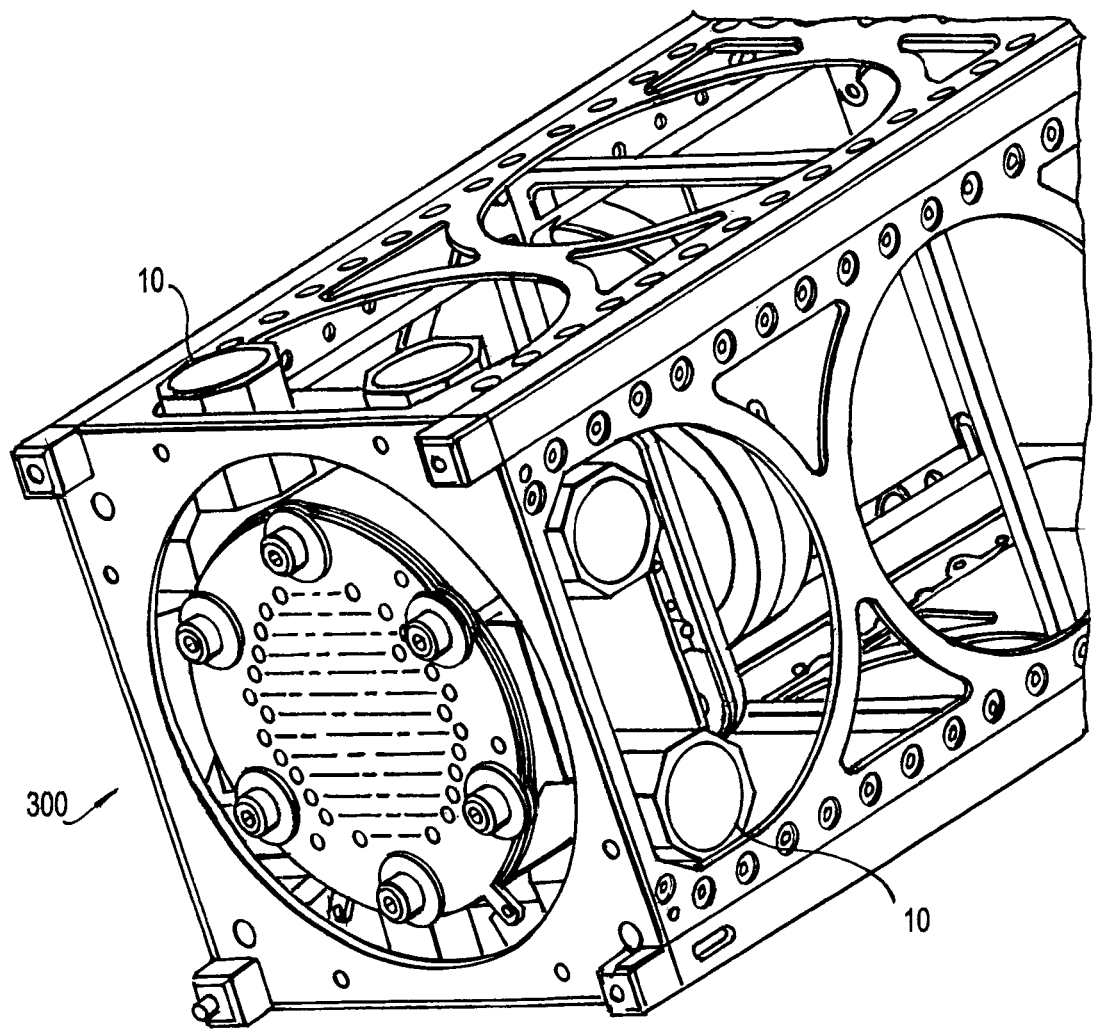
FIG. 1 is a perspective view of a CubeSat housing a gridded version of the μCAT-MPS (Micro-Cathode Arc Thruster Main Propulsion System) and eight μCAT.

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

The present invention provides a propulsion system on which different parameters can be studied to potentially mitigate some of these issues. Additionally, the system is designed to cater to small satellites.

As discussed below, two example embodiments of the invention are shown and described. FIGS. 1-4 show a plasma source (first stage) and an ion accelerator (second stage) having a screen grid and an acceleration grid, and is sometimes referred to here as the gridded embodiment. FIGS. 5-10 show an alternative embodiment having a plasma source (first stage) and a plasma accelerator (second stage), and is sometimes referred to here as the gridless embodiment. In both the gridded embodiment (FIGS. 1-4) and the gridless embodiment (FIGS. 5-10), the plasma source can be the same.

The Plasma Source (the First Stage)

Referring to FIG. 2(*a*), a first stage of the device is shown as a plasma source 100, such as a Micro-Cathode Arc Thruster (μCAT). The first stage produces the plasma that can then be accelerated using an electric field. The μCAT 100 is an electric propulsion system that is based on the well-researched ablative vacuum arc or 'cathodic arc' process [14, 15]. There is a physical phenomenon is known to erode the negative electrode (cathode) with every discharge. In this case, this is highly desirable as the cathode is the thruster's propellant. During each discharge, a small amount of metallic propellant is eroded, ionized, and expelled by a large temperature and pressure gradient from inside the cathodic spot. The efficiency is enhanced by a magnetic field [16] caused by the arc current as it travels through a magnetic coil 180 that is connected in series with the thruster prior to arcing between the electrodes.

One example of the micro-cathode arc thruster 100 is shown in FIG. 2(*a*). The thruster 100 has housing or insulated shell 110, insulator 120, anode 130, and cathode 140. The shell 110 is formed of insulated material. In the embodiment shown, the shell 110 has a main body 112, a proximal end 114 and a distal end 116. The body 112 has an elongated tubular shape with an internal bore 113. The proximal end 114 is substantially closed with a base 101 having a central opening 115. The distal end 116 is substantially opened with an inwardly extending ledge 117 that defines a large central opening. The insulator 120 also has an elongated tubular shape with a proximal end 122, distal end 124, and central bore 126. The insulator 120 is shorter in length and smaller in diameter than the insulated shell 110.

The cathode 140 has a tubular or circular shape with a larger diameter than the insulator 120. The cathode 140 has a proximal end 142, distal end 144, and central bore 146. The cathode 140 is substantially shorter in length than the insulated shell 110 and also has a smaller diameter than the insulated shell 110 and is received in the bore 113 of the shell 110.

The anode 130 is a solid rod having a circular cross-section and configured to friction fit inside the insulator bore 126. The anode 130 has a distal proximal end 132 and a distal end 134. The anode distal end 134 extends outward beyond the insulator distal end 124, the cathode distal end 144, and the shell distal end 116.

As further shown in FIG. 2(*a*), the cathode 140 is fully received in the bore 113 of the insulated shell 110. The insulator 120 is at least partially received in the bore 146 of the cathode 140. And the anode 130 is at least partially received in the bore 126 of the insulator 120. In addition, a coil or spring 150 has a diameter smaller than the shell body 112 and larger than the insulator 120. The spring 150 has a proximal end 152 and a distal end 154. The spring 150 has a length that is substantially shorter than the length of the shell 110.

Accordingly, the thruster 100 is arranged with an outermost shell 110, the cathode 140 inside the shell 110, the insulator 120 inside the cathode 140, and the anode 130 inside the insulator 120. The shell 110, cathode 140, insulator 120, and anode 130 are concentrically and sequentially arranged with one another with the shell 110 being the outermost layer and the anode 130 being innermost. The cathode 140 is arranged at the distal end portions of the shell 110, insulator 120, and anode 130, whereas the spring 150 is concentrically arranged about the proximal end portions of the shell 110, insulator 120, and anode 130. The spring 150 and cathode 140 substantially have the same diameter and are aligned with each other inside the space formed between the inner surface of the body 112 and the outer surface of the insulator 120.

Figure 2A:
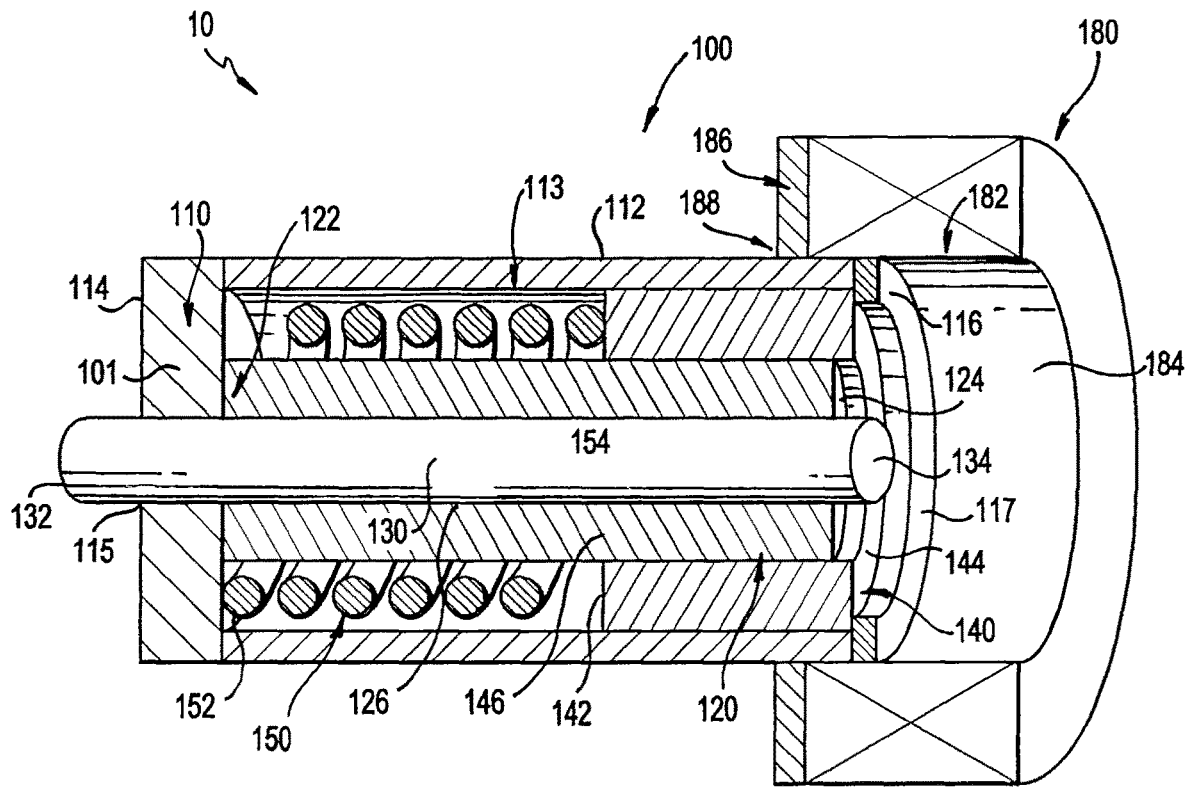
FIG. 2(a) is a cross-section view of a plasma source with a magnetic ring as used in the invention.

The cathode 140 is slidably arranged with respect to the body 112 and the insulator 120, and can slide forward (toward the shell distal end 116, which is to the right in the embodiment of FIG. 2(a). The proximal end 152 contacts the inner surface of the base 101. The distal end 154 of the spring 150 contacts the proximal end 142 of the cathode 140. The spring 150 is biased outward to apply an outward force against the cathode 140, whereby the spring 150 presses the cathode 140 against the ledge 117. The anode 130 is slidably received in the bore 126 of the insulator 120 and can slide forward in the bore 126 as it is consumed. Of course, any suitable mechanism can be used to advance the cathode 140, such as a motor or solenoid.

Thus, the spring is used as a feed system to ensure that there is always propellant available for the next discharge. The system can be pulsed and therefore, throttled by simply changing the discharge frequency. At a discharge frequency of 10 Hz, the power consumption is approximately 1 W for the current version of the µCAT. The thruster can be pulsed at frequencies between 1 and 50 Hz, depending on the requirements and mission needs. The frequency is limited by the thermal properties of the components used for the casing and most importantly, the feed system's spring, which runs the risk of getting annealed at high temperatures.

Figure 2B:
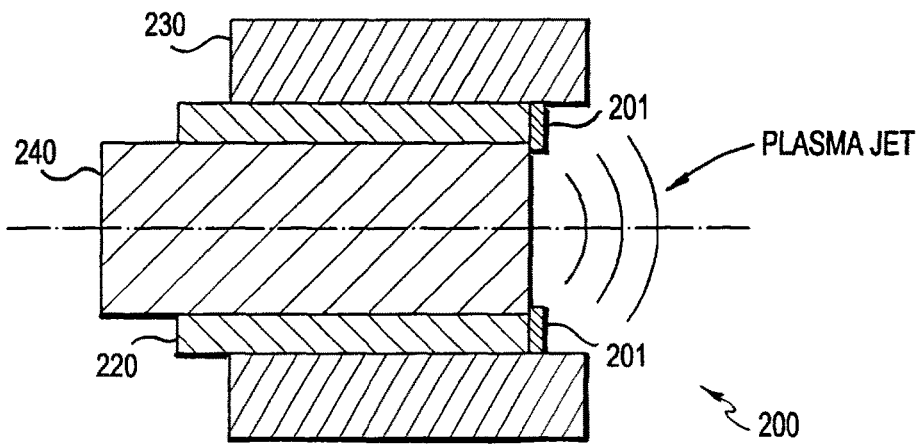
FIG. 2(*b*) is an alternative embodiment of a plasma source as used in the invention.

FIG. 2(b) shows another embodiment of a thruster 200, where the anode and cathode are switched from FIG. 2(a). Thus, the thruster 200 has a central cathode 240 and an anode 230 on the outside, separated by an insulator 220 therebetween. Accordingly, the cathode 240 is advanced with respect to the anode 230 as the cathode 240 deteriorates from use. As further shown in FIG. 2(b), a thin film 201 is provided on the distal end face of the insulator 220, and a similar film is provided on the distal end face 124 of the insulator 120 of FIG. 2(a).

The physical nature of the arc discharge allows any conductive (solid) material to be used as a propellant. The eroded material is, to a large degree, fully ionized. Additionally, it is common that the particles are multiply ionized. In the case of tungsten, the mean ion charge state $\overline{Q}$ is 4.6+ and approximately 94% of the ions have a charge state equal or higher than 3+[17].

The discharge can ablate any conductive material, which allows the thruster to operate with different metals, each with different physical properties, giving the mission designer flexibility when it comes to the mission's design, e.g. nickel will produce a higher thrust compared to titanium; but the latter offers a higher specific impulse under unchanged discharge conditions. The system does not require any pressurized tanks or other components that may otherwise be required when dealing with propellants such as xenon. This is advantageous because it greatly reduces the system's complexity and risk involved. Additionally, only an electrical connection is required to operate the thruster, since the propellant and all necessary components are integrated within the thruster's structure. Therefore, the µCAT technology offers opportunities that are unmatched by most gas-fed propulsion systems, such as the ability and flexibility of attaching the thrusters to deployable booms to increase the torque for RCS maneuvers.

To operate the thrusters, a voltage between 15 to 25 volts is provided to energize the system. The booster circuits convert the energy, producing an instantaneous peak arc discharge of approximately 50 A. This instantaneous current ablates a small fraction of the cathode and ionizes it, producing a quasi-neutral plasma that does not require a neutralizer. The plasma plume is almost fully ionized hence eliminating potential self-contamination due to the charge exchange process in the case of a weakly ionized plasma. Nickel and Titanium cathodes (propellant) have been characterized for the use in this technology and have resulted in specific impulses of 2200 s and 2800 s. The energy consumption is approximately 0.1 W/Hz for 2 micro-N-s impulse bits.

Magnetic Field

As further shown in FIG. 2(a), a magnet 180 can optionally be provided with the thruster 100, as well as the thruster 200 of FIG. 2(b). The magnet 180 collimates plasma and provides some acceleration of ions, as well as uniform erosion of the cathode 140. The magnet 180 has a magnetic coil 182 and a magnetic core 186. The magnetic coil 182 is formed as a ring with a central opening 184, and the magnetic core 186 is formed as a flat ring with a central opening 188. The magnetic core 186 has an outer surface that is affixed to an inner surface of the coil 182. Thus, the magnetic core 186 is closer to the proximal end of the plasma body 112. As further illustrated, the magnetic core 186 and at least a portion of the magnetic coil 182 is positioned about the distal end of the plasma source 100. Thus, the diameter of the bore 184 is larger than the outer diameter of the body 112, so that the coil 182 and core 186 can be received over the distal end of the plasma source 100. The magnetic core 186 can be an iron ring that keeps the magnetic field from spreading beyond it.

Accelerator (the Second Stage)

Figure 3A:
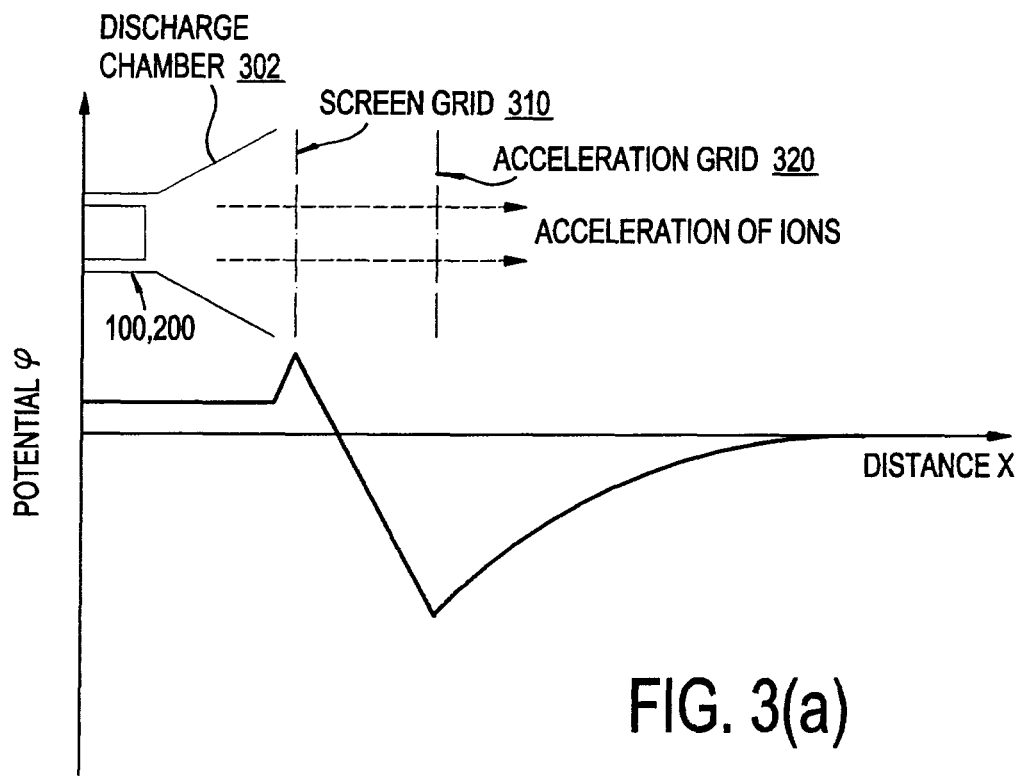
FIG. 3(*a*) shows the plasma source and discharge chamber and an acceleration apparatus having a screen grid and acceleration grid, as well as a graph showing the potential distribution across the thruster (including grids) and distance x from the thruster.
Figure 3B:
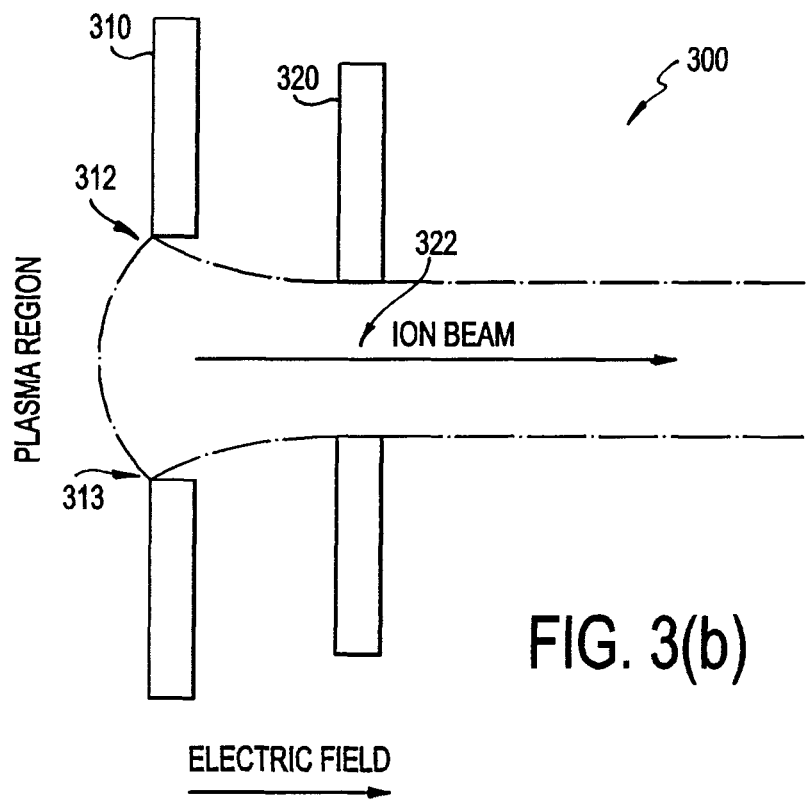
Figure 4:
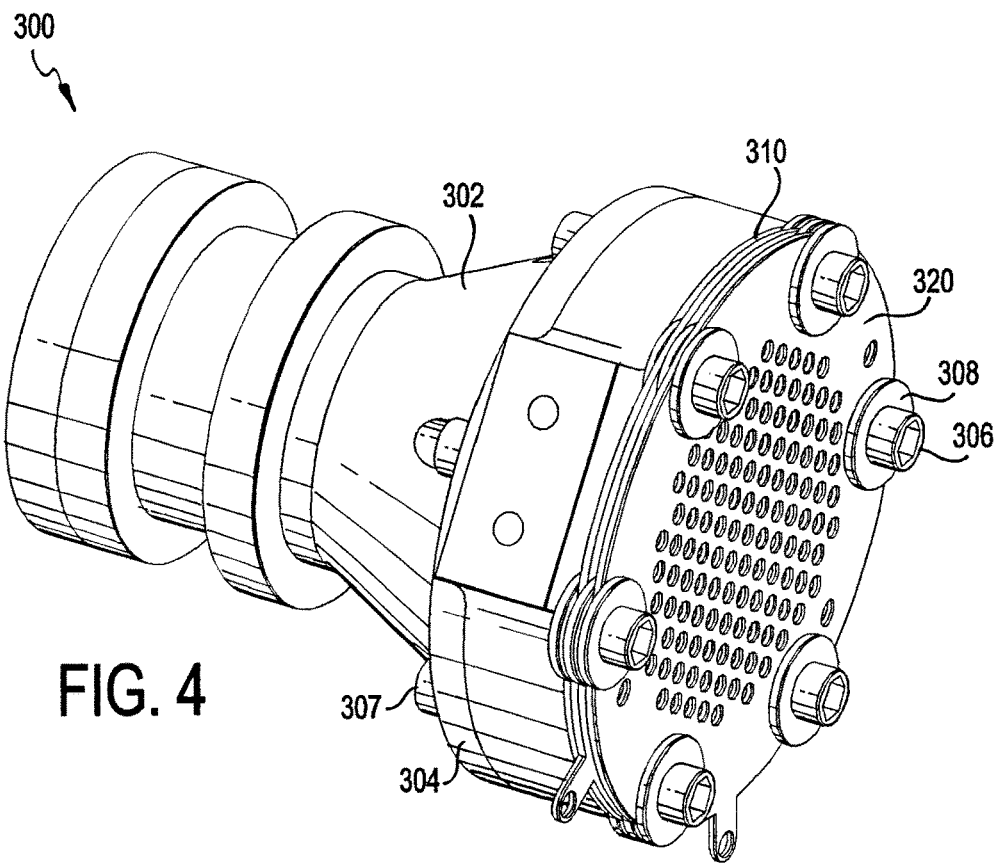
FIG. 4 shows the gridded μCAT-MPS thruster of FIGS. 1-3 made from aluminum.

Referring to FIGS. 3(a), 3(b), 4, an accelerator 300 is shown. One objective of the present invention is to produce small-satellite propulsion systems based on vacuum arcs, in this case, a spinoff of the µCAT as a plasma source. The system can use a scaled-up version of the µCAT 100, 200 as a first stage to generate a (metallic) plasma, which in turn can be accelerated by a pulsed acceleration (second) stage. Since the plasma is produced using a pulsed system, it does not make sense to have the acceleration stage operating at all times. The system of the present invention is referred to here as the Micro-Cathode Arc Thruster Main Propulsion System, or µCAT-MPS for short.

The invention is a two-stage system, which has a plasma source 100, 200 as a first stage followed by an accelerator 300 as a second stage. The plasma source 100, 200 generates plasma or a plasma jet, and the accelerator 300 accelerates the ions from the plasma to produce an ion beam. The system operates as a miniaturized gridded ion thruster. Though the plasma sources 100, 200 are shown as examples of plasma sources, any suitable plasma source can be utilized.

In the example embodiment of FIGS. 3(a), 4, the accelerator or acceleration system 300 has a shell or cone 302, a screen grid 310 and an acceleration grid 320. The cone 302 is made of metal, such as a metal sheet, and has a thin conical wall with an open center interior that forms a discharge chamber. As shown in FIG. 3(a), the proximal end of the cone 302 touches and is in electrical contact with the distal end of the anode 230 of the plasma source 200 (where the plasma source 100 is used, the cone 302 need not touch the anode, but can be separately connected to the positive terminal of the power source). Accordingly, the cone 302 has the same positive potential as the anode 230. In addition, the cone 302 expands outward the further away from the plasma source 100, 200. The cone 302 further contains the plasma and directs the plasma toward the screen grid 310, and protects against outside influences to provide an electrical shield.

The grids 310, 320 are flat metal plates that are arranged about the output of the plasma source 100, 200. The grids 310, 320 are planar and extend substantially in parallel planes to each other. The screen grid 310 has at least one opening, and as shown a plurality of openings 312 arranged in rows and/or columns. The openings 312 are closely spaced to one another and extend the entire area of the screen grid 310. The acceleration grid 320 is similar to the screen grid 310, and has at least one opening and as shown a plurality of openings 322 arranged in rows and/or columns.

In one embodiment, the screen grid openings 312 have a diameter of about 1.5 mm, and the acceleration grid openings 322 have a diameter of about 1.3 mm. Ideally, the size should be as small as possible and there should be as many holes as close to each other as possible to increase the ion optics transparency to extract as many ions as possible. However, the openings 312, 322 can have a diameter of about 0.25 mm. Size is selected by using a multiple of the Debye length (a characteristic of the plasma given by the electron temperature and the electron density), which is usually in the sub-millimeter size. However, any suitable size and shape can be utilized for the openings 312, 322.

Referring to FIG. 3(b), the screen grid openings 312 are each aligned with a respective acceleration grid opening 322. Thus, the ions can travel in a linear path. This avoids losses and changing the electric field in a way that could cause an increase in grid erosion by the ions travelling in an undesired path that could cause them to collide with the grids and erode or damage them. Each screen grid opening 312 has a diameter that is larger than the diameter of the respective acceleration grid opening 322, so that the grids are stepped down in the direction of the ion beam. The conical electric field facilitates ion extraction and protects the grids from erosion. However, the openings 312, 322 need not be different sizes, but can be the same size, or the acceleration grid openings 322 can be larger than the screen grid opening 312.

The screen grid 310 is closer to the plasma source 100, 200 and the acceleration grid 320 is further from the plasma source 100, 200. The screen grid 310 is positively charged (e.g., about 25V) to keep ions from impacting that grid 310, so that the ions pass through the screen grid opening 312. The acceleration grid 320 is highly negatively biased (e.g., about −1 kV) to accelerate ions and create a strong acceleration field between the screen grid 310 and the acceleration grid 320. Thus, the grid produce electrostatic acceleration due to the strong electric fields between them. In FIG. 3(a), for instance, the potential is directly proportional to the electric field (U=E*x). The closer the grids 310, 320 are to each other, the stronger the electric fields. Accordingly, the grids 310, 320 are substantially the same size, and are located as closely as possible, permitting for physical limitations.

As further shown in FIG. 4, a spacer or hub 304 can be located at the distal end of the cone 302. In the embodiment shown, the hub 304 has a circular band shape and provides spacing between the discharge chamber at the interior volume or space of the cone 302, and the screen grid 310. The screen grid 310 is attached to the distal end of the hub 304. If a hub is not needed, than the screen grid 310 can be attached to the distal end of the cone 302. The screen grid 310 covers the open end of the cone and hub 304. And the acceleration grid 320 is attached to the outside of the screen grid 310. A first set of fasteners are provided to couple the hub 304 to the cone 302, and a second set of fasteners 306 are provided to attach the screen grid 310 and the acceleration grid 320 to the hub 304. Insulative spacers 308, such as ceramic disks, are provided about the fasteners 306 between the hub 304 and the screen grid 310, between the screen grid 310 and the acceleration grid 320, and between the acceleration grid and the fastener 306, to electrically isolate the cone 302 and hub 304, the screen grid 310 and the acceleration grid 320. The grids 310, 320 can have tabs for use as handles and/or electrical connections.

In operation, plasma is output from the plasma source 100, 200 and enters the discharge chamber inside the cone 302, where it forms a plasma cloud. As the plasma comes close to the screen grid opening 312, such as within the ion zone 313 illustrated by the curved lines in FIG. 3(b), the ions from the plasma are drawn by the negative force of the acceleration grid 320. Since the screen grid 310 is positively charged, the ions move inwardly and become more densely packed. The ions are pulled through the screen grid openings 312 and through the acceleration grid openings 322, and exit as an ion beam. It is further noted that to keep the system stable, the excess negative electrons must be removed from the system. That is, since the accelerator 300 removes the positive ions, the system must also discharge the negative electrons to keep the system stable. Thus, the grids 310, 320 can be operated to only produce an electric field when ions production is needed. Systems of grids create the flux of accelerated positive particles (ions) only. Because of that, the satellite will gain a large positive potential that must be neutralized by additional emitter of negative particles (such as electrons) placed on the same satellite, such as for example a hollow cathode or other type of suitable neutralizer.

The field strength is represented in FIG. 3(a), where the potential is steady and then peaks upward slightly at the screen grid 310 due to the positive charge of the screen grid 310. It then drops to a negative charge the closer the ion gets to the acceleration grid 320, where it peaks negative. The sharper the incline between the positive and negative peaks, the faster the ion travels (i.e., the stronger the acceleration that the ion experiences).

Turning back to FIG. 1, the bottom part of a 3 U CubeSat is shown without its bottom plate and the gridded version of the μCAT-MPS. Both devices fit in a 1 U to 1.5 U form factor for its use in CubeSats. The system includes eight μCAT thrusters 10 (the plasma sources themselves, without acceleration) for attitude control and the thruster at the bottom end with the accelerator 300 for a large propulsion force (though the accelerator of FIG. 5 can instead be provided). This configuration enables a CubeSat to perform full three-axis stabilization and it would have the ability to perform orbital maneuvers and drag-compensation maneuvers. The outer diameter of the grids shown in FIGS. 3(a), (b) is approximately 80 mm, but it can be modified so that it fits within the standard "tuna-can" compartment of a 3 U CubeSat.

FIG. 3(a) shows the potential distribution of the system. Inside the thruster 100, 200 (i.e. the first stage), the plasma assumes the anode potential, which is slightly positive (approx. +25V). The plasma expands within the second stage and reaches the screen grid 310, that is at a slightly higher positive potential (approx. 50V) to prevent ions from colliding with the grid and eroding it. Moreover, this grid 310 sets up the acceleration electric field together with second grid 320 (acceleration grid, at −1 kV or lower). Therefore, the magnitude of the acceleration field is the difference between both potentials. Ions are accelerated by this electric field and, once they leave the grid area, the potential they are subjected to decreases by $1/r^2$ over the distance x. FIG. 3(a) shows a small acceleration section in the grids 310, 320. The electric field produces strengthens due to the shape of the grids and increase the local electric field, thus making the ion acceleration more efficient.

The first stage includes different plasma properties inside the discharge chamber of the cone 302. Since this electric field is pulsed, it needs to last enough to accelerate all the ions emitted from the cathode during the discharge. In addition to these plasma and ion beam measurements, the gridded µCAT-MPS can be placed on a newly developed thrust stand designed for micro-Newton thrust measurements. The measurements will allow for a precise calculation of the specific impulse of the system. The data obtained throughout this test campaign will be used to improve the device and will also be used to design the TAL version of the µCAT-MPS. This version will require additional testing, such as in-channel measurements of the plasma characteristics. Single and two-stage operation will be tested with this device on the thrust stand.

The inductive-storage Pulsing Power Unit (PPU) consists of a 300-500 pH ferrite-core inductor, electrolytic capacitor (several hundreds µF), a high-power Insulated-gate bipolar transistor (IGBT), and a 25 V dc power supply. The PPU can be triggered by a 5 V pulsing rectangular signal with a constant pulse width of 300-500 µs and a variable pulse repetition rate between 1-30 Hz. At the moment of triggering, the PPU produces an instant spike of voltage of 600-1500 kV between the anode and the cathode of the first stage of thruster. This voltage pike leads to surface flashover over the anode-cathode gap and therefore to the ignition of the arc with burning voltage of 25-30 V. Arc current amplitude during single pulse was 30-70 A, and arc pulse duration was within 200-1000 µs, depending on capacitance and anode-cathode resistance. PPU average power, depending on pulse repetition rate, was within 0.1-10 W.

Figure 5:
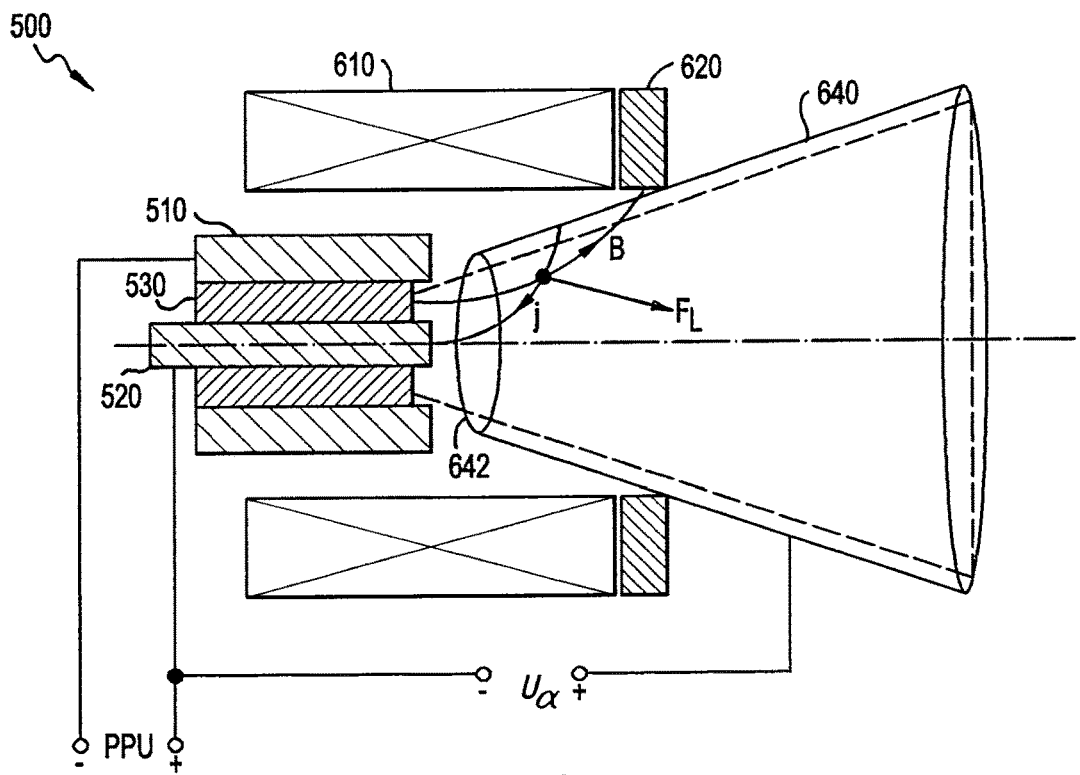
FIG. 5 is a block diagram schematic of the two-stage (μCAT-MPD) (Magneto Plasma Dynamical) thruster in accordance with an alternative embodiment of the invention.

Plasma Thruster (FIG. 5)

In yet another embodiment shown in FIG. 5, the second phase can be another µCAT thruster. But instead of a gridded ion thruster, the acceleration stage can be a variant of a Magneto Plasma Dynamical (MPD) thruster. The MPD version of the µCAT-MPS can be capable of working in two-stage mode, as opposed to the gridded version, which cannot operate in single-stage mode because the grids would block off most of the plasma.

The plasma source 500 is similar to that of FIG. 2(*b*), with a central cathode 520 and an anode 510 at the outside with an insulator 530 therebetween, and a film on the distal end face of the insulator 530. And, a magnet 610 is provided about the distal end of the plasma source 500, similar to FIG. 2(*a*), but with the iron ring 620 at the distal end of the magnet 610. In addition, a cone 640 is provided near the distal end of the plasma source 500. The cone 640 can be the same shape as cone 302 (FIG. 4), but here the cone 640 is spaced apart from the plasma source 500 and does not touch the anode 510. Accordingly, there is a gap between the distal end of the cone 640 and the proximal end of the cone 640. The cone 640 is a thin metal wall having a hollow center forming a discharge chamber. A positive signal is applied to the cone 640, which accelerates the plasma by the Lorentz force $F_L$, which is a vector product between current density j and magnetic field strength B, as shown.

Performance Data

Both µCAT-MPS thrusters (FIGS. 1-4 and FIG. 5) are a significant improvement over the original µCAT system in terms of efficiency due to the highly-efficient additional acceleration second stage. Table 1 below shows the expected performance data for the different µCAT systems. The systems can have a total efficiency of over 50%. The technology can have a large impact in the field of electric propulsion for CubeSats, since only ten CubeSats out of over 400 have had a propulsion system on board, and from those ten, only two have been electric propulsion systems [18], one of them was the Naval Academy's BRICSat-P CubeSat which carried four µCATs on board [19]. The µCAT-MPS is designed to enable complex missions such as interplanetary CubeSat missions and to extend missions in low earth orbit. The µCAT system provides a reaction control system thrusted for attitude control operations. The plasma thrusts produce smaller forces that can be used to change the orientation of the craft.

Micro-cathode arc thrusters (µCATs) produce typical thrust of up to 10 µN at specific impulse of 1000-3000 s. They have typical thrust-to-power ratio (TPR) of several µN/W. The trend of increasing the average mass of CubeSats requires the increase of not only the levels of thrust (thrust of up to mN range is desirable) but also the growth of TPR, since, in order to increase thrust, just simple increase of the number of miniature µCATs on the heavy cubesat will lead to (1) increase in the electromagnetic noise, (2) bulky and power-consumptive PPUs and, finally, to (3) the dramatic loss of propulsive engine efficiency. Therefore, the research of the approaches for improvement of both thrust and TPR level of µCATs seems to be highly relevant. In this invention, improved the thrust and thrust-to-power ratio of coaxial µCAT by introducing of a second stage based on Magneto Plasma Dynamical (MPD) approach. "Dynamical" means that the accelerating object is quasi-neutral plasma itself (not only ions), and acceleration occurs due to electromagnetic Lorentz force. Therefore, the MPD thruster has a very sufficient advantage over the gridded thruster, namely that the MPD thruster expels the neutral plasma, so it does not require to host on satellite any negative particles emitter (charge neutralizer), so MPD thruster is expected to be more energy-effective.

The schematic of an example embodiment of a µCAT-MPD 50 is shown in FIG. 5. The thruster has a plasma source 500 and an accelerator 600. The plasma source 500 includes an anode 510, cathode 520, and insulator 530 therebetween. The anode 510 is a tube that forms an outer ring or layer of the plasma source 500 and has a central bore. The insulator 530 is a tube having a central bore and a diameter that is smaller than the diameter of the anode 510. The cathode 520 is a rod. The cathode 520 is received in the bore of the insulator 530, and the insulator 530 is received within the bore of the anode 510. The cathode and anode have distal ends that can be substantially flush with each other. The cathode 520 can slide forward and rearward in the insulator to remain flush with the anode 510 as the anode is consumed. The anode, insulator and cathode are concentrically arranged with the cathode 520 forming the innermost layer and the anode forming the outermost layer.

The accelerator 600 includes a magnetic coil 610 and an iron ring 620. The magnetic coil 610 has a ring shape and is elongated. The iron ring 620 has a flat shape. The iron ring 620 can be adjacent to or affixed to the outermost distal end of the magnetic coil 610. At least a portion of the proximal end of the magnetic coil 610 overlaps with and surrounds the distal end of the ionizer 500. The iron ring 620 is put after the magnetic coil in order to bend magnetic lines and therefore enlarge the radial component of magnetic field (radial component is important for plasma acceleration).

Thus, the plasma source 500 includes a coaxial µCAT with central copper cathode 520 and outer annular anode 510, separated by the alumina ceramics tube 530 with inter-electrode gap covered by carbon film at the distal end face of the insulator between the anode and cathode. The plasma source 500 is a first stage (preliminary source of plasma). The plasma is ignited as a result of surface flashover of the anode-cathode gap, and then is expelled from the cathodic spot toward the opening of the accelerating electrode 640. The cone 640 has an inlet opening and an outlet opening, with the outlet opening being much larger than the inlet opening. This electrode had a frustum cone shape, with the smaller opening close to the thruster face. Plasma is expelled from the large outlet opening of the cone as exhaust. The cone is located in the central plane of magnetic pulsing solenoid, fed by additional PPU and producing a magnetic field with variable value of 0-120 mT. The voltage $U_a$ between grounded cathode and accelerated electrode (cone) can be set by a dc power supply (up to 63 V). The iron ring 620 is put close to the solenoid between the solenoid and the cone, in order to concentrate magnetic field and bend the magnetic lines and therefore enlarge the radial part of magnetic field in "thruster face-cone entrance" interface.

For the MPD thruster, a constant dc voltage can be used from 0 to 63 V on the cone. This voltage can be pulsing, with amplitude up to 50 V, steady-state value of up to 50 V during 50-500 µs. The moment of arc ignition in first stage should be somewhere in the middle of the voltage pulse on the cone, in order to provide constant acceleration parameters. The acceleration rate is given as thrust vs. accelerating voltage at maximal coil current in FIG. 9(a).

The principle of the MPD stage operation is as follows. Plasma ions and electrons are expelled from a cathodic spot on the surface of the cathode 520 towards the entrance of the cone. Plasma electrons rotate around and drift along magnetic field lines B toward the surface of the cone due to positive potential $U_a$. Interaction between electron current density j and magnetic field lines B leads to Lorentz force $F_L$ directed toward the exhaust of the thruster; this force accelerates both ions and electrons, fast electrons in turn accelerate ions due to electrostatic coupling and finally increases the total thrust. Additionally, ions also accelerate due to so-called "magnetic mirror" effect. Thus, the acceleration of the plasma will be stronger for higher magnetic field and the higher current density. One important advantage of the MPD concept is that it is grid less, so the thrust will not be decreased because of the absorption of the plasma particles by the grid cells. The cone serves as an electrode to control current distribution. The cone attracts a huge amount of electrons, which flow toward the cone and produce a large current j. Interaction between this current j and the magnetic field B results in the Lorentz force $F_L$ applied to both ions and electrons, which accelerates them.

Figure 6:
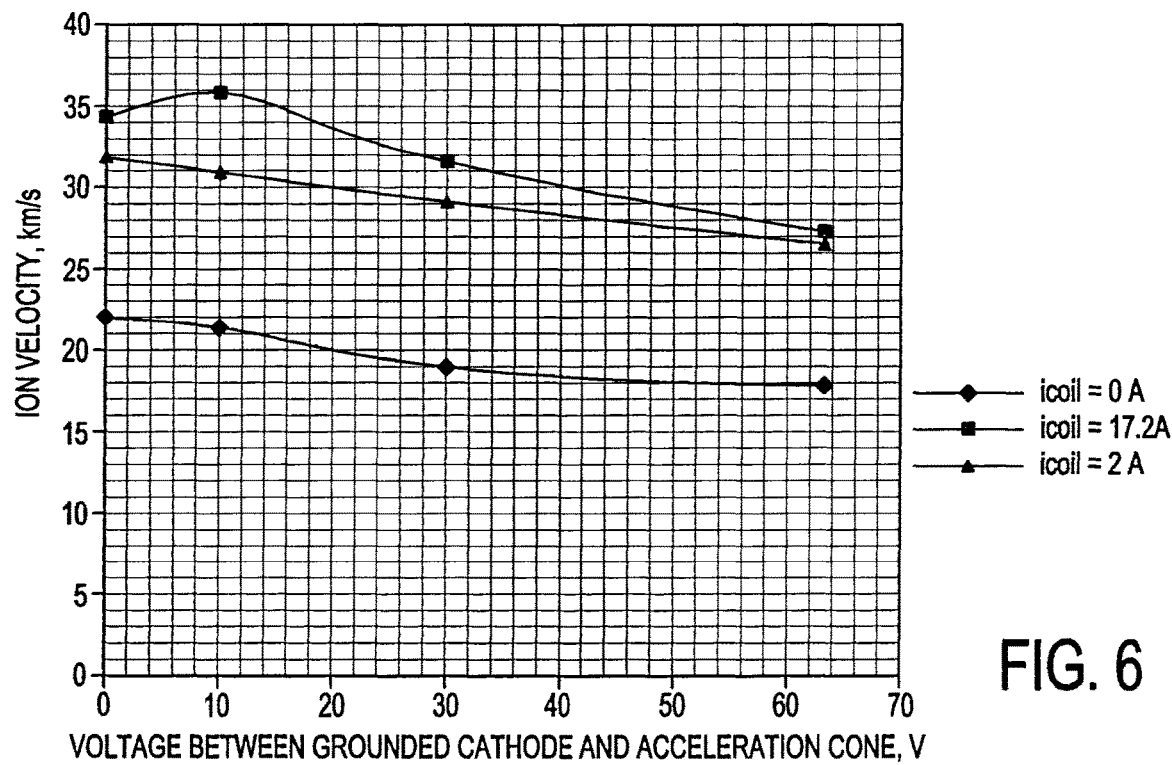
FIG. 6 is a graph showing the ion velocity vs. accelerating voltage $U_a$ at different currents in magnetic coil.
Figure 7:
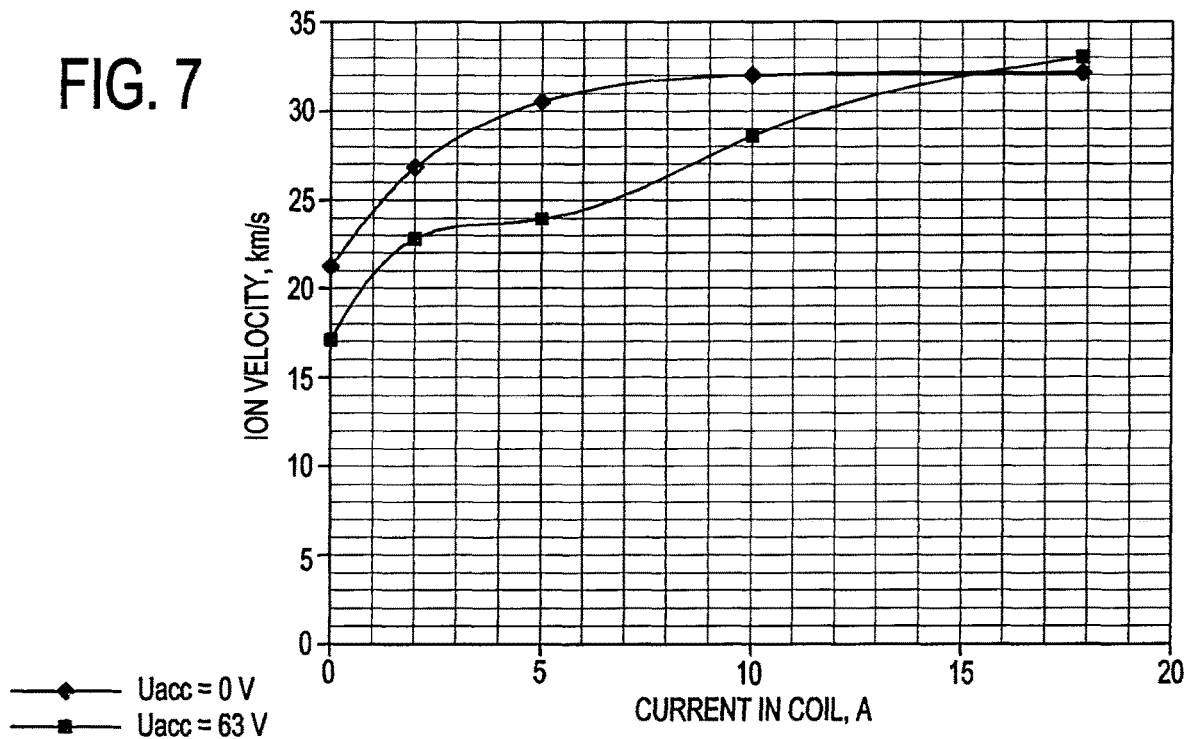
FIG. 7 is a graph showing the ion velocity vs. coil current $I_c$ at different $U_a$.

To characterize this µCAT-MPD thruster of FIG. 5, several diagnostics (ion velocity time-of-flight, total ion current, electrical power, indirect thrust measurements) were implemented. The results of ion velocity measurements as the function of accelerating electrode voltage $U_a$ and current in magnetic coil $I_c$ are given in FIGS. 6, 7. In FIG. 6, ion velocity slightly decreases with $U_a$. One reason could be deceleration of ions due to positive cone potential. Note that for the fixed arc current amplitude determined by the PPU of the first stage, just a small voltage of 10-20 V on the cone is sufficient to attract the majority of electron current, so do not need to increase $U_a$ so much and thereby decelerate ions. Increase of $I_c$ at fixed $U_a$ leads to significant increase of ion velocities, but both FIGS. 6, 7 confirm a kind of saturation on "ion velocity vs. coil current" trend. One possible reason of this saturation is the effect of the saturation of magnetic field value as a result of magnetization of the iron rings.

Figure 8A:
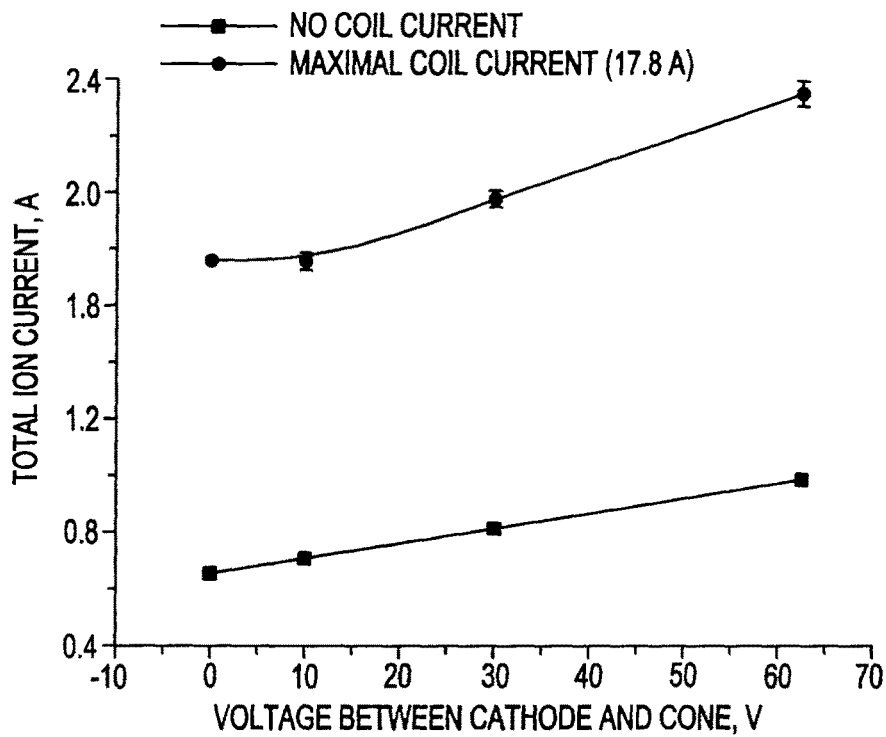
FIG. 8(*a*) is a graph of total ion current vs. accelerating voltage Ua, with maximal current in magnetic coil, and without current in magnetic coil, for μCAT-MPD thruster.
Figure 8B:
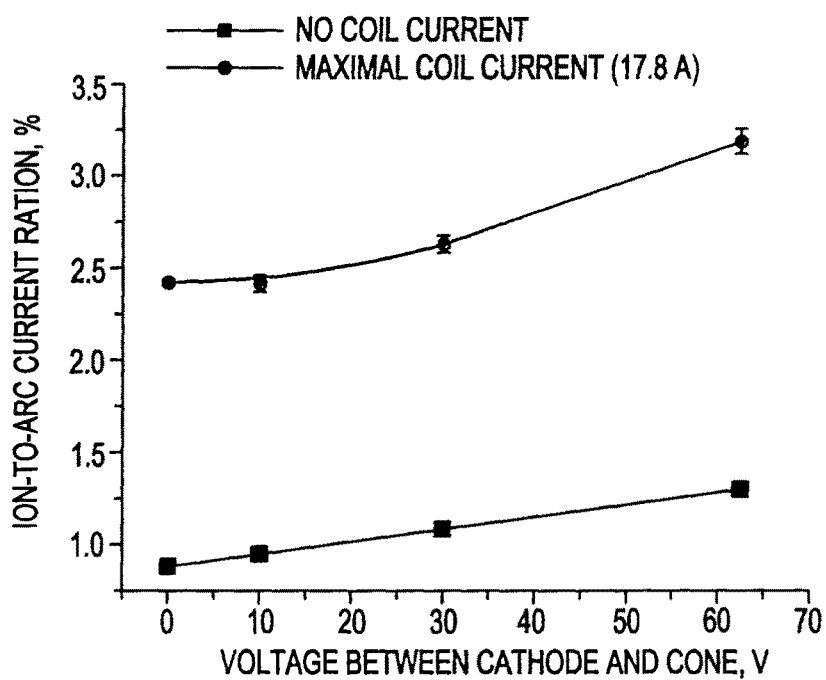

The measurements for FIG. 5 of total ion current and ion-to-arc current ratio vs. $U_a$ and $I_c$ are given in FIGS. 8(a), (b). Here, both total ion current as well as ion-to-arc current ratio clearly increases with the growth of $U_a$ (+33% and +32% at maximal coil current, respectively). For every value of the cone voltage, the presence of the magnetic field leads to increase of the total ion current and ion-to-arc current ratio in more than two times. Using the respective values of ion velocities and total ion current values, thrust and impulse bit of the µCAT-MPD were estimated using the following formulas:

$$T = E_r I_i v_i \tau f, I_{bit} = E_r I_i v_i \tau \tag{1}$$

where $E_r$ is erosion rate for ions from cathodic spot for copper (50 µg/C), $I_i$, $v_i$ are total ion current and velocity, respectively, r is arcing pulse duration (200-300 µs), f is pulse repetition rate (5 Hz).

Figure 9A:
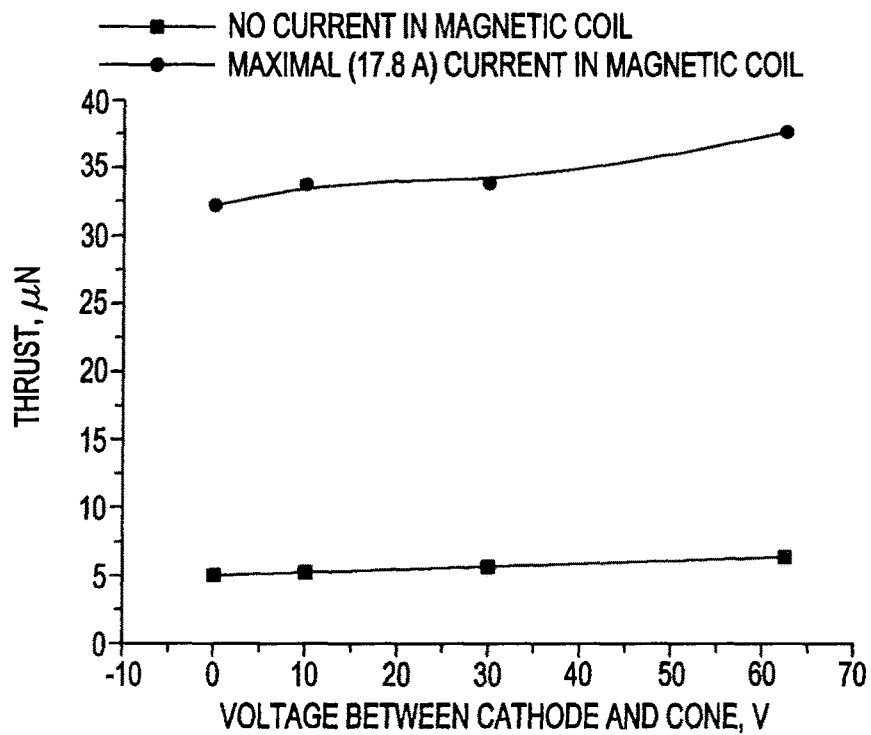
FIGS. 9(*a*), (*b*) are graphs showing calculated thrust and impulse bit for μCAT-MPD.
Figure 9B:
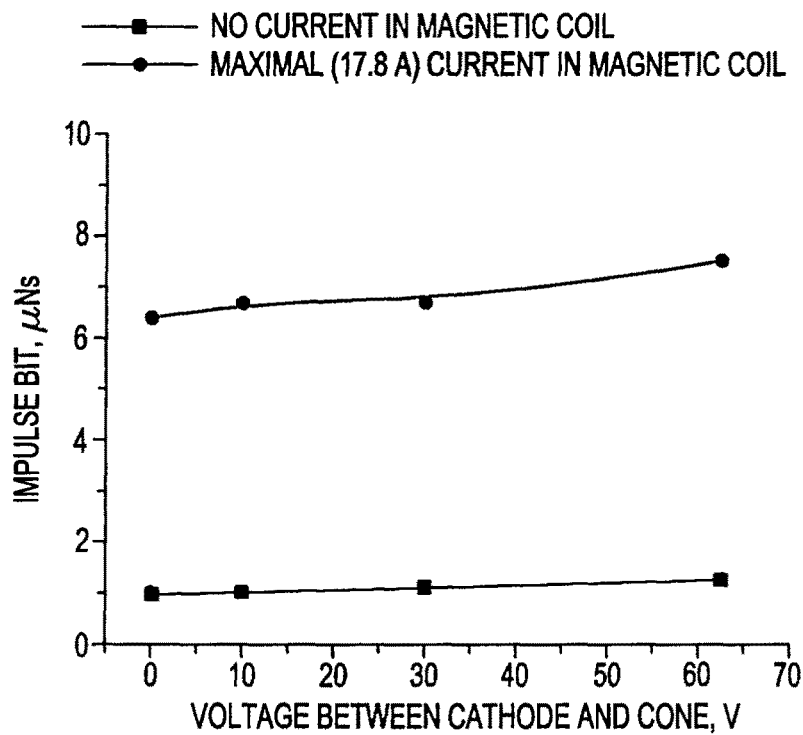

Calculated thrust and impulse bit vs. $U_a$, without $I_c$ and with maximal $I_c$, is given in FIGS. 9(a), (b) for the thruster of FIG. 5. Here, both thrust and impulse bit for µCAT-MPD with the highest $U_a$ and magnetic coil current is in 7.5 times higher than with no magnetic field and accelerating voltage. These results illustrate the significant improvement of µCAT by addition of MPD stage. Now let us consider the power dissipated in µCAT and MPD stage (with power in coil) and check whether the thrust-to-power ratio in µCAT+MPD configuration is higher than with the simple µCAT. In FIG. 9(a), the upper curve represents the MPD thruster (FIG. 5), and the lower curve is first stage (plasma source) only.

Figure 10A:
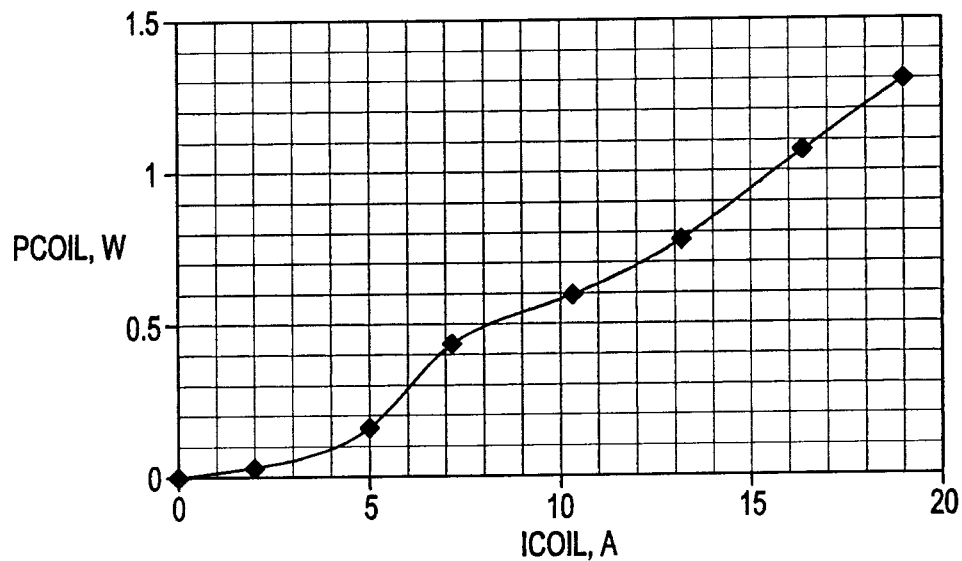
FIGS. 10(*a*), (*b*) are graphs showing average power dissipated in coil (FIG. 10(*a*)), and magnetic field in the coil center (FIG. 10(*b*)), as the function of the coil pulsing current amplitude, where the magnetic field B is determined according to FEMM simulations for the given coil current and coil and thruster materials and geometry.
Figure 10B:
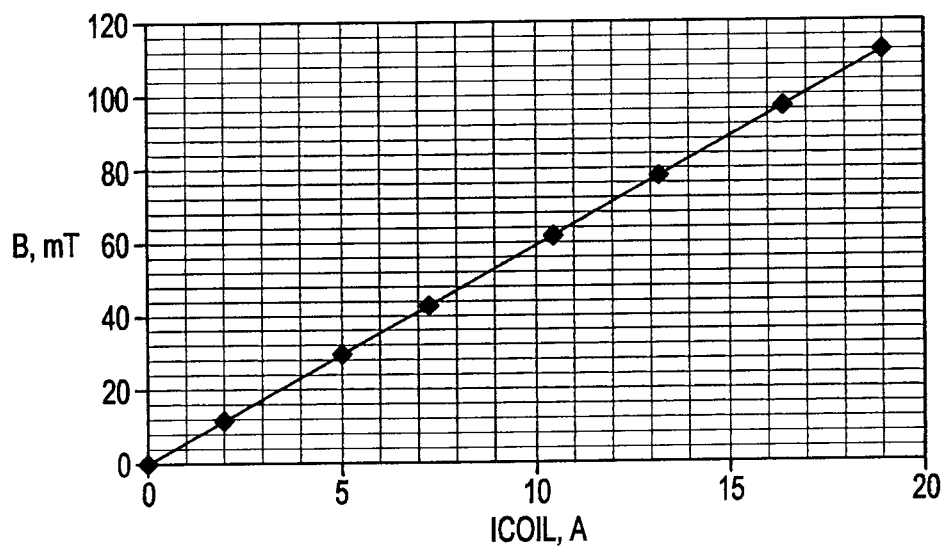

Power dissipated in magnetic coil, and magnetic field in the center of the coil, are given in FIGS. 10(a), (b). Average power dissipated in coil (left), and magnetic field in the coil center (right), as the function of the coil pulsing current amplitude. Magnetic field B is determined according to FEMM simulations for the given coil current and thruster materials and geometry.

Average power in coil was determined by measuring coil current and voltage waveforms and then calculated using Matlab script. From FIG. 10 (left) this power is not higher than 1.3 W for the maximal coil current of 19 A. This data allows us to compare thrust, dissipated power and TPR for both "single-stage only µCAT" (FIG. 2(b), without any magnetic coils in the first stage) and "µCAT+MPD" (FIG. 5) configurations. Results are summarized in Table 1 below.

TABLE 1

Comparison of single-stage µCAT and µCAT + MPD configurations.

| Configuration | Thrust, µN | Impulse bit, µNs | $P_{avg}$ in µCAT, W | $P_{avg}$ in MPD, W | $P_{avg}$ in coil, W | Total $P_{avg}$, W | TPR, µN/W |
|---|---|---|---|---|---|---|---|
| No B, No Ua (µCAT) | 5.3 | 1.05 | 0.78 ± 0.04 | 0 | 0 | 0.78 ± 0.04 | 6.83 |
| Maximal B and $U_a$ (µCAT + MPD) | 37.8 | 7.55 | 1.59 ± 0.03 | 1.09 ± 0.06 | 1.3 | 3.98 ± 0.09 | 9.5 |

Table 1 shows that the μCAT+MPD thruster shows not only great increase in thrust, but also in thrust-to-power ratio, which means that such configuration is more efficient. However, further experiments need to be done in order to optimize and improve TPR of the μCAT+MPD thruster.

Conclusion

The development of the Micro-Cathode Arc Thruster of the present invention has shifted towards higher-power applications. The current invention focuses on increasing the overall system efficiency of the μCAT system by adding a secondary acceleration stage to the system. This can occur in two phases, where a gridded version of the μCAT is provided and then a second thruster based on a magneto plasma dynamical (MPD) thruster, is provided. The systems have been designed to be used for CubeSat applications, ideally for spacecraft larger than 3 U given the expected power consumption of these systems and their form factors. These thrusters can enable mission designers to push the boundaries of what is currently possible with conventional CubeSat propulsion systems.

In addition, a processing device such as a process can be provided that controls: (1) the arcing pulse repetition rate, (2) pulsing power unit charge voltage and, therefore, energy that will be released within one pulse, (3) current amplitudes in magnetic coils (for focusing, accelerating magnetic fields etc, (4) and voltage values between accelerating grids or on other accelerating electrodes. By varying the mentioned parameters electrically, it is possible to achieve dynamic control.

It is further noted that the description uses several geometric or relational terms, such as circular, stepped, concentric, cone, conical, and flat. In addition, the description uses several directional or positioning terms and the like, such as bottom, surface, inner, outer, distal, and proximal. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention. In addition, while the invention is shown and described as having discharge chambers contained within cone-shaped housings 302, 640, and circular plates for grids 310, 320, other sizes and shapes can be utilized for those elements.

Within this specification, the various sizes, shapes and dimensions are approximate and exemplary to illustrate the scope of the invention and are not limiting. The sizes and the terms "substantially" and "about" mean plus or minus 15-20%, more preferably plus or minus 10%, even more preferably plus or minus 5%, most preferably plus or minus 1-2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention.

The following references are herein incorporated by reference. [1] Musilová, M., Smelko, M., Lipovský, P., Kapuš, J., Závodský, O., and Slošiar, R. "skCUBE Very-Low-Frequency Radio Waves Detector and Whistlers," 2017 8th International Conference on Mechanical and Aerospace Engineering (ICMAE). IEEE, 2017, pp. 292-295. [2] Dudás, L., Varga, L., and Seller, R. "The communication subsystem of Masat-1, the first Hungarian satellite," Proceedings of SPIE. Vol. 7502, 2009, p. 75020L. [3] Borgeaud, M., Scheidegger, N., Noca, M., Roethlisberger, G., Jordan, F., Choueiri, T., and Steiner, N. "SwissCube: The First Entirely-Built Swiss Student Satellite with an Earth Observation Payload," Small Satellite Missions for Earth Observation: New Developments and Trends. Springer Berlin Heidelberg, Berlin, Heidelberg, 2010, pp. 207-213. [4] Gomez, M., Calvo-Alvarado, J., Calvo-Obando, A. J., Chavez Jimenez, A., Carvajal-Godinez, J., Valverde, A., Ramirez, J., and Alvarado Briceño, C. "Irazú: CubeSat mission architecture and development," 67th International Astronautical Congress, 23rd IAA Symposium on small satellite missions (B4). Guadalajara, Mexico, 2016.

[5] "https://science.msfc.nasa.gov/content/moonbeam-moon-burst-energetics-all-sky-monitor." Accessed Oct. 5, 2017. [6] Dunning, J. W., Benson, S., and Oleson, S. "NASA's Electric Propulsion Program," 27th International Electric Propulsion Conference, Pasadena, CA, US. 2001. [7] Hofer, R. R., Peterson, P. Y., Gallimore, A. D., and Jankovsky, R. S. "A high specific impulse two-stage Hall thruster with plasma lens focusing," IEPC-01-036, 27th International Electric Propulsion Conference, Pasadena, CA. 2001. [8] Shabshelowitz, A., Gallimore, A. D., and Peterson, P. Y. "Performance of a Helicon Hall Thruster Operating with Xenon, Argon, and Nitrogen," Journal of Propulsion and Power Vol. 30, No. 3, 2014, pp. 664-671. [9] Beal, B. E., and Gallimore, A. D. "Development of the linear gridless ion thruster," 37th Joint Propulsion Conference and Exhibit, AIAA Paper. Vol. 3649, 2001. [10] Chang-Diaz, F. R. "The VASIMR," Scientific American Vol. 283, No. 5, 2000, pp. 90-97. [11] Longmier, B. W., Squire, J. P., Olsen, C. S., Cassady, L. D., Ballenger, M. G., Carter, M. D., Ilin, A. V., Glover, T. W., McCaskill, G. E., and Chang-Diaz, F. R. "VASIMR® VX-200 Improved Throttling Range," Proc. 48th AIAA/ASMESAEASEE Joint Propuls. Conf. 2012.

[12] Solodukhin, A., Semenkin, A., Tverdohlebov, S., and Kochergin, A. "Parameters of D-80 anode layer thruster in one- and two-stage operation modes," International Electric Propulsion Conference, IEPC-01-032, Pasadena, Ca. 2001. [13] Sengupta, A., Marrese-Reading, C., Cappelli, M., Scharfe, D., Tverdokhlebov, S., Semenkin, S., Tverdokhlebov, O., Boyd, I., Keidar, M., and Yalin, A. An overview of the VHITAL program: a two-stage bismuth fed very high specific impulse thruster with anode layer: Pasadena, CA, US: Jet Propulsion Laboratory, National Aeronautics and Space Administration, 2005. [14] Boxman, R. L., Sanders, D. M., and Martin, P. J. Handbook of Vacuum Arc Science & Technology: Fundamentals and Applications: William Andrew, 1996. [15] Anders, A. Cathodic Arcs: From Fractal Spots to Energetic Condensation: Springer, 2009.

[16] Keidar, M., Schein, J., Wilson, K., Gerhan, A., Au, M., Tang, B., Idzkowski, L., Krishnan, M., and Beilis, I. I. "Magnetically enhanced vacuum arc thruster," Plasma Sources Science and Technology Vol. 14, No. 4, 2005, p. 661. [17] Oks, E. M., Anders, A., Brown, I., Dickinson, M., and MacGill, R. "Ion charge state distributions in high current vacuum arc plasmas in a magnetic field," IEEE Transactions on Plasma Science Vol. 24, No. 3, 1996, pp. 1174-1183. [18] Lemmer, K. "Propulsion for CubeSats," Acta Astronautica Vol. 134, 2017, pp. 231-243. [19] Hurley, S., Teel, G., Lukas, J., Haque, S., Keidar, M., Dinelli, C., and Kang, J. S. "Thruster Subsystem for the United States Naval Academy's (USNA) Ballistically Reinforced Communication Satellite (BRICSat-P)," 34th International Electric Propulsion Conference and 6th Nano-satellite Symposium, Kobe-Hyogo, Japan, 2015.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A thruster comprising:
   a plasma source having a plasma source distal end that emits plasma;
   an accelerator having an accelerator proximal end and an accelerator distal end, said accelerator proximal end aligned with and positioned near the plasma source distal end to receive the plasma and accelerate the plasma;
   a gap between the accelerator proximal end and the plasma source distal end;
   a magnet positioned about a distal end of said plasma source proximal end of said accelerator, and
   a power source providing a pulsed power signal to said magnet, said plasma source, said accelerator, a screen grid and an accelerator grid to reduce power consumption of said thruster.

2. The thruster of claim 1, said accelerator made of conductive material and having a symmetrical shape, said accelerator further having an inlet opening at the accelerator proximal end and an outlet opening at the accelerator distal end, the inlet opening receiving the plasma from said plasma source distal end and said accelerator accelerating the plasma out through the outlet opening.

3. The thruster of claim 1, wherein said accelerator controls current distribution to accelerate ions and electrons in the plasma.

4. The thruster of claim 1, wherein said thruster can be utilized on a CubeSat.

5. The thruster of claim 1, further comprising a magnetic core positioned about the accelerator.

6. The thruster of claim 1, further comprising a current passing through a metal cone, wherein said magnet provides a magnetic field that with the current induces a force that accelerates the plasma.

7. The thruster of claim 1, further comprising a power source providing a pulsed power signal to said plasma source and said accelerator to reduce power consumption of said thruster.

8. The thruster of claim 1, further comprising:
   a metal cone having a cone proximal end aligned with the plasma source, said metal cone produces current in a radial direction, said metal cone having an input that receives the plasma and a cone distal end;
   a screen grid positioned adjacent the cone distal end and having one or more screen grid openings, said screen grid positively charged to repel ions between the one or more screen grid openings; and
   an accelerator grid positioned adjacent the screen grid and having one or more accelerator grid openings, said accelerator grid negatively charged to attract ions between the screen grid openings and accelerate the ions through the accelerator grid openings.

9. The thruster of claim 8, wherein the screen grid and the accelerator grid comprise metal plates.

10. The thruster of claim 8, wherein said accelerator grid has a negative charge that is substantially greater than the positive charge of the screen grid.

11. The thruster of claim 8, wherein the screen grid openings are larger than the accelerator grid openings.

12. The thruster of claim 8, wherein said thruster can be utilized on a CubeSat.

13. The thruster of claim 8, further comprising a magnet positioned about a distal end of said plasma source and a proximal end of said metal cone.

14. The thruster of claim 8, further comprising a power source providing a pulsed power signal to said plasma source, said metal cone, said screen grid and said accelerator grid to reduce power consumption of said thruster.

15. The thruster of claim 8, wherein the screen grid and the accelerator grid are planar and substantially parallel to one another.

16. The thruster of claim 15, wherein the screen grid is separated from the accelerator grid by a predefined distance.

* * * * *